US010711888B2

(12) United States Patent
Tardif-Leblanc et al.

(10) Patent No.: US 10,711,888 B2
(45) Date of Patent: Jul. 14, 2020

(54) ELECTROMECHANICALLY ACTUATED CONTINUOUSLY VARIABLE TRANSMISSION SYSTEM AND METHOD OF CONTROLLING THEREOF

(71) Applicant: SOCOVAR, SOCIÉTÉ EN COMMANDITE, Montreal (CA)

(72) Inventors: Raphaël Tardif-Leblanc, Pabos (CA); Alex Guilbeault-Sauvé, Verdun (CA); Danny St-Martin, Mandeville (CA); Maxime Lasnier, Ste-Brigide d'iberville (CA); Samuel Maurais Filteau, Montreal (CA)

(73) Assignee: SOCOVAR, SOCIÉTÉ EN COMMANDITE, Montréal (CA)

( * ) Notice: Subject to any disclaimer, the term of this patent is extended or adjusted under 35 U.S.C. 154(b) by 100 days.

(21) Appl. No.: 15/840,545

(22) Filed: Dec. 13, 2017

(65) Prior Publication Data

US 2018/0172150 A1 Jun. 21, 2018

Related U.S. Application Data

(60) Provisional application No. 62/435,339, filed on Dec. 16, 2016.

(30) Foreign Application Priority Data

Dec. 16, 2016 (CA) ..................... 2951857

(51) Int. Cl.
*F16H 61/662* (2006.01)
*F16H 9/18* (2006.01)
(Continued)

(52) U.S. Cl.
CPC ............. *F16H 61/662* (2013.01); *F16H 9/18* (2013.01); *F16H 61/66259* (2013.01);
(Continued)

(58) Field of Classification Search
CPC ............................ F16H 63/062; F16H 63/067
See application file for complete search history.

(56) References Cited

U.S. PATENT DOCUMENTS 2,711,103 A * 6/1955 Miner ................. F16H 61/6625
474/19
7,771,300 B2 8/2010 Starkey et al.
(Continued)

FOREIGN PATENT DOCUMENTS

WO WO 2011/032252 A1 3/2011
WO WO 2011/032254 A1 3/2011

OTHER PUBLICATIONS

Boran S., Samo S., Shuyuan M., An Overview on Control Concepts of Push-Belt CVT, 2012, International Journal of Engineering and Technology, vol. 4, No. 4.
(Continued)

*Primary Examiner* — Derek D Knight
(74) *Attorney, Agent, or Firm* — Anglehart et al.

(57) ABSTRACT

A pulley for a continuously variable transmission (CVT) and a method of controlling the pulley. The pulley has a main shaft, a fixed sheave, a mobile sheave and a cam system. The fixed sheave is fixedly mounted on the main shaft and has a fixed belt groove portion. The mobile sheave is movably mounted on the main shaft and has a mobile belt groove portion, the mobile sheave is mounted on the main shaft such that the fixed belt groove portion and the mobile belt groove portion form a riding path for a drive belt and is axially movable with respect to the main shaft such as to vary an effective diameter of the pulley by increasing or decreasing an axial space between the mobile sheave and the fixed sheave. The cam system is mounted at one end via a bearing fitted around the primary shaft to the mobile sheave. The cam system is adapted to provide an axial movement to
(Continued)

the mobile sheave in order to increase or decrease the axial space between the mobile sheave and the fixed sheave.

18 Claims, 16 Drawing Sheets

(51) Int. Cl.
    *F16H 63/06*     (2006.01)
    *F16H 59/24*     (2006.01)
    *F16H 59/54*     (2006.01)
    *F16H 59/36*     (2006.01)

(52) U.S. Cl.
    CPC ........... *F16H 63/062* (2013.01); *F16H 59/24* (2013.01); *F16H 59/36* (2013.01); *F16H 59/54* (2013.01); *F16H 2059/366* (2013.01)

(56) References Cited

U.S. PATENT DOCUMENTS

| | | |
|---|---|---|
| 8,682,549 B2 | 3/2014 | Roberge et al. |
| 9,109,694 B2 | 8/2015 | Lafreniere et al. |
| 9,429,235 B2 | 8/2016 | Krosschell et al. |

OTHER PUBLICATIONS

Budynas R. G., Nisbett J. K., Shigley's Mechanical Engineering Design, 10th Ed., 2014, McGraw Hill, New York, abstract.

F. Asselin F., Conception d'un modèle mathématique pour une transmission aà poulie aà variation continue, 2012, École de technologie supérieure, Montréal.

H. Gibbs, J., Actuated Continuously Variable Transmission For Small Vehicles, 2009, The Graduate Faculty of The University of Akron, Akron, Ohio, USA.

Oberg E., D. Jones F., L. Horton H., H. Ryffel H., Machinery's Handbook, 28th Edition, 2008, Industrial Press Inc., New-York, abstract.

Ryan J., Helm B., Tranter M., Orakwue O., Baja Drive Line Test Development, 2010, Rochester Institute of Technology, Rochester, New-York, USA.

\* cited by examiner

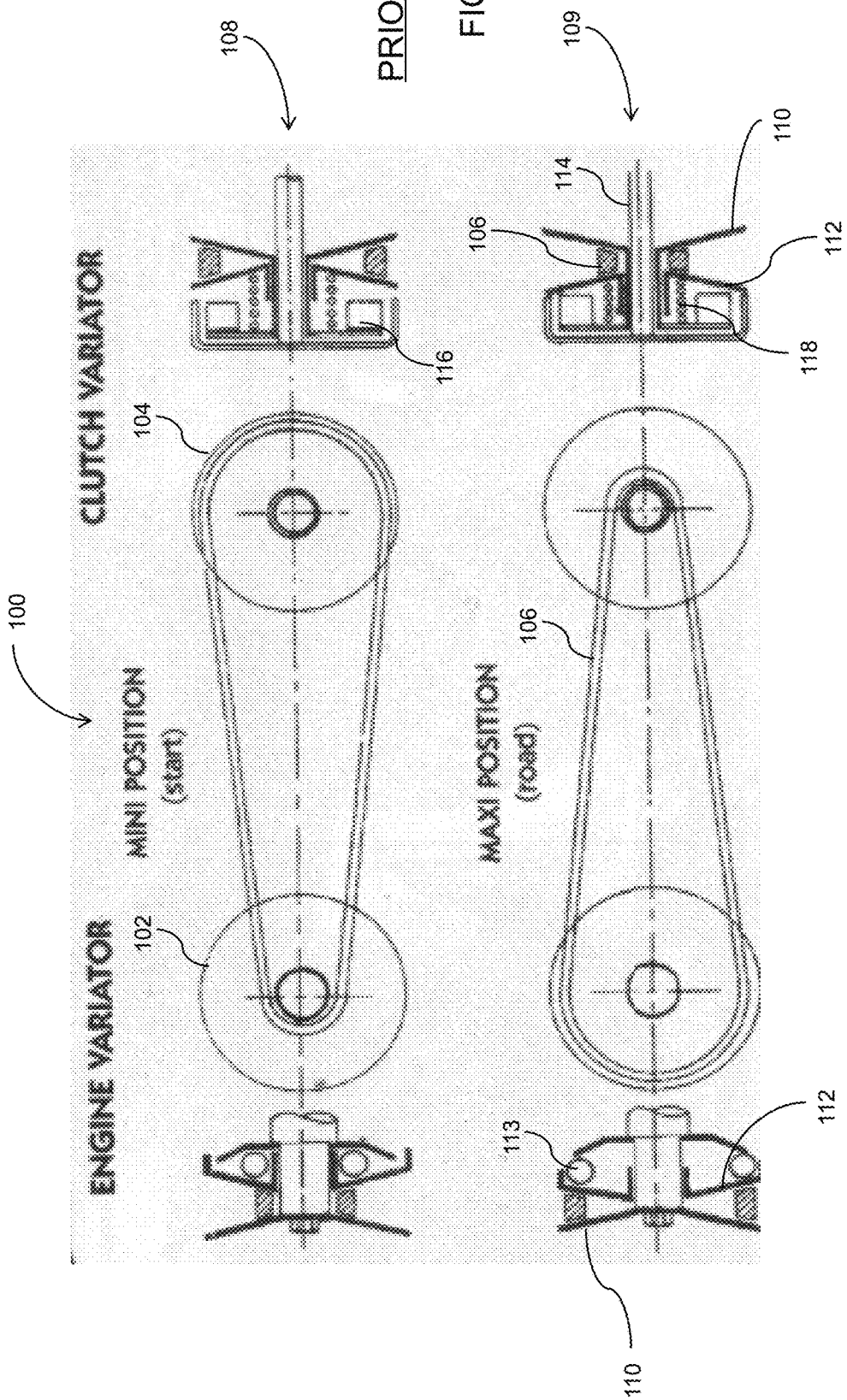

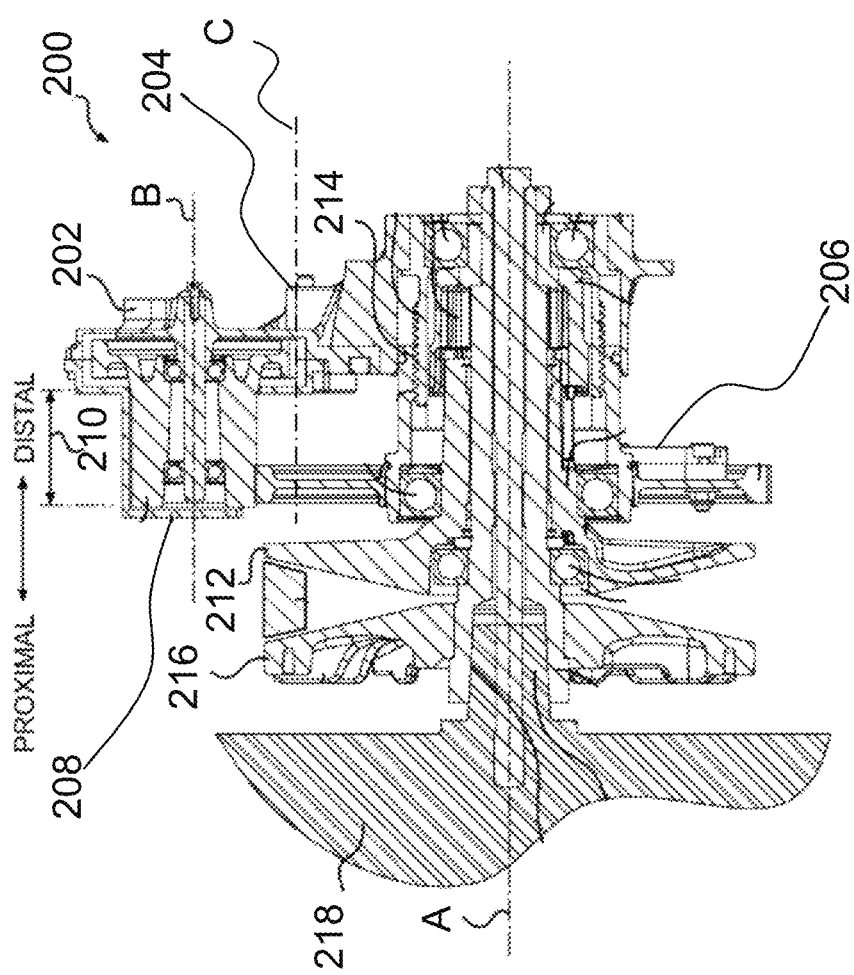

ELECTROMECHANICALLY ACTUATED CONTINUOUSLY VARIABLE TRANSMISSION SYSTEM AND METHOD OF CONTROLLING THEREOF

CROSS-REFERENCE TO RELATED APPLICATIONS

This application is a non-provisional claiming priority of U.S. provisional 62/435,339 filed on Dec. 16, 2016 and Patent Application in Canada No. 2,951,857 filed on Dec. 16, 2016, the contents of which are hereby incorporated by reference.

TECHNICAL FIELD

The present relates to continuously variable transmissions (CVT) and methods of controlling the CVT. More particularly, the present relates to electromechanically controlled CVTs and methods of controlling thereof.

BACKGROUND

Vehicles such as trucks, cars, scooters, tractors and most types of all-terrain vehicles (ATVs) are equipped with a mechanical continuously variable transmission (CVT) system. A continuously variable transmission (CVT) (also known as a single-speed transmission, stepless transmission, pulley transmission, or, in case of motorcycles, a twist-and-go) is an automatic transmission that can change seamlessly through a continuous range of effective gear ratios. This contrasts with other mechanical transmissions that offer a fixed number of gear ratios. The flexibility of a CVT allows the input shaft to maintain a constant angular velocity.

As presented in prior art FIG. 1, the CVT 100 system normally includes a primary pulley 102 mounted to the vehicle engine, a secondary pulley 104 connected to the vehicle propulsion assembly through some mechanical power transmission mean, and a drive belt 106 linking the pulleys and transferring the power from the primary pulley to the secondary pulley. The CVT 100 provides a continuous range of effective transmission ratio between the two pulleys in order to maintain an optimal engine rotational speed at a given rotational speed of the secondary pulley 104. As the vehicle accelerates or decelerates, the CVT 100 system varies the ratio accordingly. The ratio variation is achieved by changing the diameter at which the drive belt 106 winds around both pulleys. From a stopped state a vehicle CVT is required to transmit a great torque at a low speed. The winding diameter at the primary pulley 102 should then be much smaller than that of the secondary pulley 104, as presented by CVT 100 in minimum ratio position 108. Then, as the vehicle accelerates, the winding diameter of the primary pulley 102 increases while that of the secondary pulley 104 decreases, thereby transmitting a weaker torque to the propulsion assembly at a greater speed, as presented by CVT 100 in maximum ratio position 109. CVT system 100 can be driven by various power sources such as by a combustion engine, an electric motor, a turbine, etc. Moreover, CTV systems can also be used for driving other types of equipment such as conveyors, snow blowers, etc.

Each pulley (102 and 104) of the CVT 100 includes two main parts called sheaves (110 and 112) that are mounted, through a concentric hole, onto the pulley's supporting shaft 114. Each sheave has a conically shaped surface facing the opposite sheave forming a V-shaped circular groove between the pair of sheaves. The trapezoidal drive belt 106 that links both pulleys is seated midway in the grooves formed by the two opposite sheaves of each pulley. For each pulley, one 110 of the two sheaves is mechanically fixed to one end of the pulley's supporting shaft 114, whereas the other sheave 112 can slide freely along the shaft. The former is often called the fixed sheave 110 and the latter is called the mobile sheave 112. As the mobile sheave slides along the shaft, the distance between the conical faces changes and influences the size of the operating diameter around which the drive belt winds into the pulley thereby achieving the change in ratio of the CVT.

The torque supplied to the primary pulley by the engine is transmitted to the drive belt 106, then to the secondary pulley 104 by means of the friction between the conical surfaces of the sheaves and the sides of the drive belt 106. In order to prevent the drive belt from slipping onto the sheaves, a sufficient friction force must be sustained. This friction force is proportional to the axial force that is applied against the mobile sheave, forcing the mobile sheave to push the drive belt 106 towards the fixed sheave in order to pinch the drive belt between the two sheaves (110 and 112). The axial force, also called clamping force, is either provided by the result of force equilibrium within a tuned mechanical system, or is controlled using various motorisation or actuation systems.

The mechanical systems on which most CVTs rely to generate the clamping force are often comprised of springs, cams and centrifugal weights. Typically, the primary pulley takes advantage of the combination of a spring potential energy pushing the sheaves apart, and a group of weights 113 evenly distributed around the pulley shaft which exert a clamping force due to the centrifugal force generated by the rotational speed. The mobile sheave of the primary pulley is thereby pushed towards the fixed sheave, forcing the drive belt to wind up on a greater diameter which increases the tension in the drive belt. This additional induced tension forces the drive belt to wind down on a smaller operating diameter in the secondary pulley, therefore requiring the mobile sheave of the secondary pulley to yield and spread apart from the fixed sheave. As the mobile sheave 112 moves away under the additional tension induced in the drive belt 106, the clamping system (116 and 118) of the secondary pulley 104 opposes a reaction force produced by the mobile sheave displacement and the torque applied onto it. This axial force is often generated by a spring 118 compressing as the mobile sheave moves apart and a biasing mechanism redirecting the rotating torque axially towards the mobile sheave. A typical biasing mechanism comprises a cam and a sliding assembly 116. The torque received by the mobile sheave of the secondary pulley is transferred to the cam system. The cam system redirects the force axially and thereby increases the clamping force of the secondary pulley.

The performance of the CVT is measured by the rate at which its components will reach a state of force equilibrium when exposed to a load transition. However, these components (springs 118, cam 116 and weights 113) are subject to a hysteresis effect which considerably slows down the CVT's reaction to changes in vehicle speed. This phenomenon compromises the reliability of the CVT when quick shifting and back shifting reactions are required. Another common problem of the mechanical CVT is that is requires adjustments that are complex. Tuning the springs 118, masses 113 and choosing the right cam 116 in order to meet desired performance requires experience and time. Also, a setup tuning is only efficient for a limited range of performances. Therefore, the mechanical CVT that is precisely tuned to provide optimal acceleration will present limited performances in other applications such as handling sudden increase in torque.

Some CVT systems require using motorisation or actuation techniques instead of the conventional spring, mass and cam assembly. U.S. Pat. No. 8,682,549 to Roberge et al. describes an electronically controlled drive pulley 200 of a CVT, as presented in prior art FIGS. 2A and 2B. The electronically controlled drive pulley 200 has an electric actuation motor 202 adapted to rotate a plurality of operatively interconnected gears housed in a gearbox 204 to ultimately rotate a main actuation gear 206 at a desired speed.

As it is better seen in prior art FIG. 2B, the electric actuation motor 202 is operatively connected to the gearbox 204 that, itself, is operatively connected to the main actuation gear 206 via an elongated gear 208. The elongated gear 208 is provided with rather long teeth to accommodate a complete teeth-engaging axial displacement 210 thereon of the main actuation gear 206 that longitudinally moves along with an axially moveable sheave 212. The main actuation gear 206 is secured on a female threaded body 214. The female threaded body 214 upon rotation, transforms the rotation of the main actuation gear 206 into an axial movement that impacts the axial distance between the sheaves 212 and 216. It is the axial position of the axially moveable sheave 212 (distal in respect with the engine 218) that changes while the fixed sheave 216 remains axially at the same position. Any rotation of the electric actuation motor 202 is therefore transformed into a change in distance between both sheaves 212 and 216 of the drive pulley 200 to alter the transmission ratio of the CVT 10.

While such actuated systems provide precise and immediate control of the CVT ratio, a greater quantity of parts is however required. This results in large and complex assemblies, thus increasing the risk of a failure to occur.

Other CTV systems have a clutching system which allows disconnecting the pulleys from either the engine or the propulsion assembly. Centrifugal clutches and axial pressure clutches are the most common systems used. While this feature is essential to ensure a proper engagement of the engine power to the propulsion assembly as it is helpful to prevent too much torque from passing through the transmission, it often increases considerably the amount of inertia in the system. The power required to accelerate the transmission is increased and therefore the performance is diminished.

Therefore, there is a need for a system that easily allows precise and immediate control of the CVT ratio in order to provide performance over its full operative range without being complex to manufacture or maintain and without generating unnecessary inertia in the transmission.

SUMMARY

The present invention includes improvements over one or more points of the systems described in the prior art.

According to one aspect, there is an electromechanically actuated continuously variable transmission (CVT) for a vehicle. The CVT has a primary pulley that is connectable to engine of the vehicle and a secondary pulley that is connectable to a propulsion system of the vehicle. The primary pulley is adapted to drive the secondary pulley with a drive belt that rides on the secondary pulley and the primary pulley. The primary pulley has a primary shaft, a fixed sheave and a mobile sheave, a cam system and an actuation device. The fixed sheave is fixedly mounted on the primary shaft and has a fixed belt groove portion. The mobile sheave is movably mounted on the primary shaft and has a mobile belt groove portion. The mobile sheave is mounted on the primary shaft such that the fixed belt groove portion and the mobile belt groove portion form a riding path for the drive belt and is axially movable with respect to the primary shaft such as to vary an effective diameter of the primary pulley by increasing or decreasing an axial space between the mobile sheave and the fixed sheave. The cam system is rotatably connected to the mobile sheave and is adapted to provide an axial movement to the mobile sheave in order to increase or decrease the axial space between the mobile sheave and the fixed sheave. The actuation device has a drive motor and an electronic controller adapted to receive sensor input from an engine speed sensor, a throttle position sensor and a mobile sheave position sensor, the drive motor is connected to the cam system and is adapted to actuate the cam system with a torque movement, according to a revolution speed of the engine, a throttle position and an actual position of the mobile sheave.

According to another aspect, there is a pulley for a continuously variable transmission (CVT). The pulley has a main shaft, a fixed sheave, a mobile sheave and a cam system. The fixed sheave is fixedly mounted on the main shaft and has a fixed belt groove portion. The mobile sheave is movably mounted on the main shaft and has a mobile belt groove portion, the mobile sheave is mounted on the main shaft such that the fixed belt groove portion and the mobile belt groove portion form a riding path for a drive belt and is axially movable with respect to the main shaft such as to vary an effective diameter of the pulley by increasing or decreasing an axial space between the mobile sheave and the fixed sheave. The cam system is mounted at one end via a bearing fitted around the primary shaft to the mobile sheave. The cam system is adapted to provide an axial movement to the mobile sheave in order to increase or decrease the axial space between the mobile sheave and the fixed sheave.

According to yet another aspect, there is a method of controlling a continuously variable transmission (CVT) having a controllable pulley having a mobile sheave and a fixed sheave. The method includes measuring an engine revolution speed, reading a throttle position, sensing an actual position of the mobile sheave of the pulley. The method further includes determining a target position of the mobile sheave, according to the measured engine revolution speed and the throttle position. The method further includes determining a control signal adapted to control an actuation device, according to the actual position of the mobile sheave and the determined target position. The method also includes providing a rotational movement to a cam system according to the determined control signal and providing an axial movement to the mobile sheave according to the provided rotational movement.

BRIEF DESCRIPTION OF THE DRAWINGS

Further features and advantages of the present invention will become apparent from the following detailed description, taken in combination with the appended drawings, in which:

FIG. 1 presents a prior art primary pulley, secondary pulley and drive belt assembly for performing ratio variations in a mechanical Continuously Variable Transmission (CVT) system;

FIG. 2B presents section view of the prior art primary pulley of FIG. 2B;

It will be noted that throughout the appended drawings, like features are identified by like reference numerals.

DETAILED DESCRIPTION

Figure 2A:
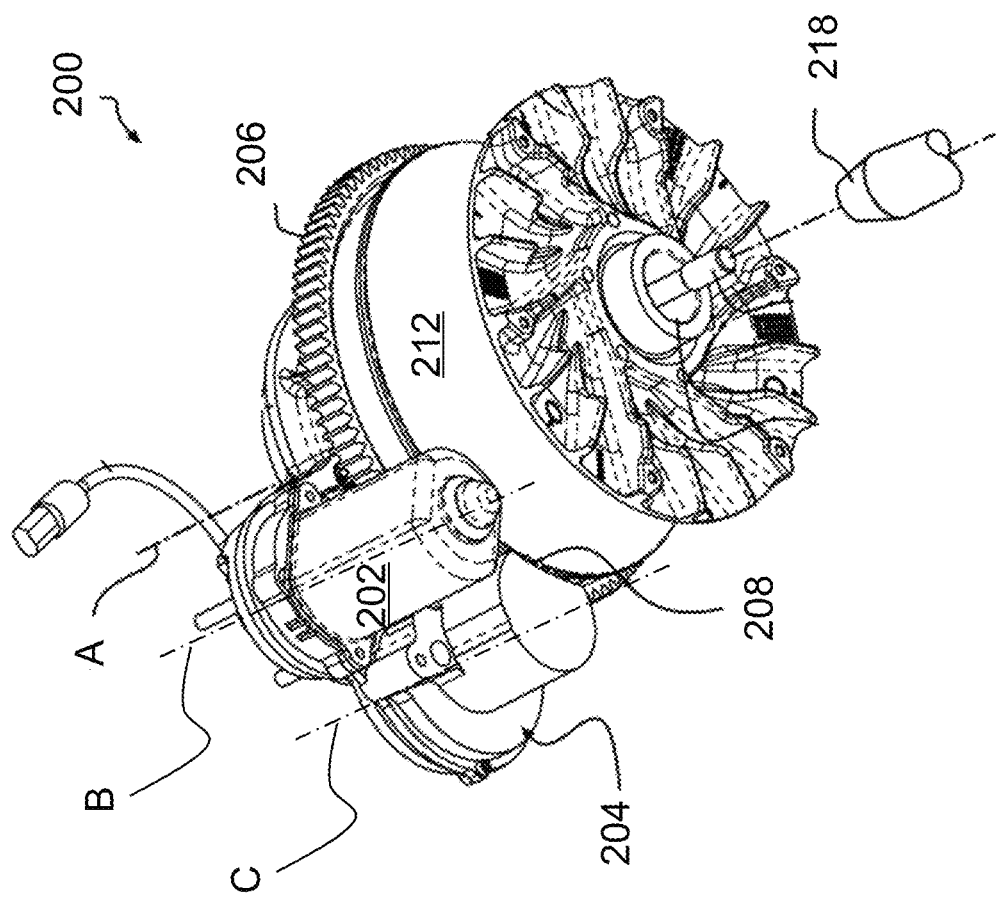
FIG. 2A presents a prior art primary pulley of an electromechanical CVT having a gear and an acme thread system.
Figure 3:
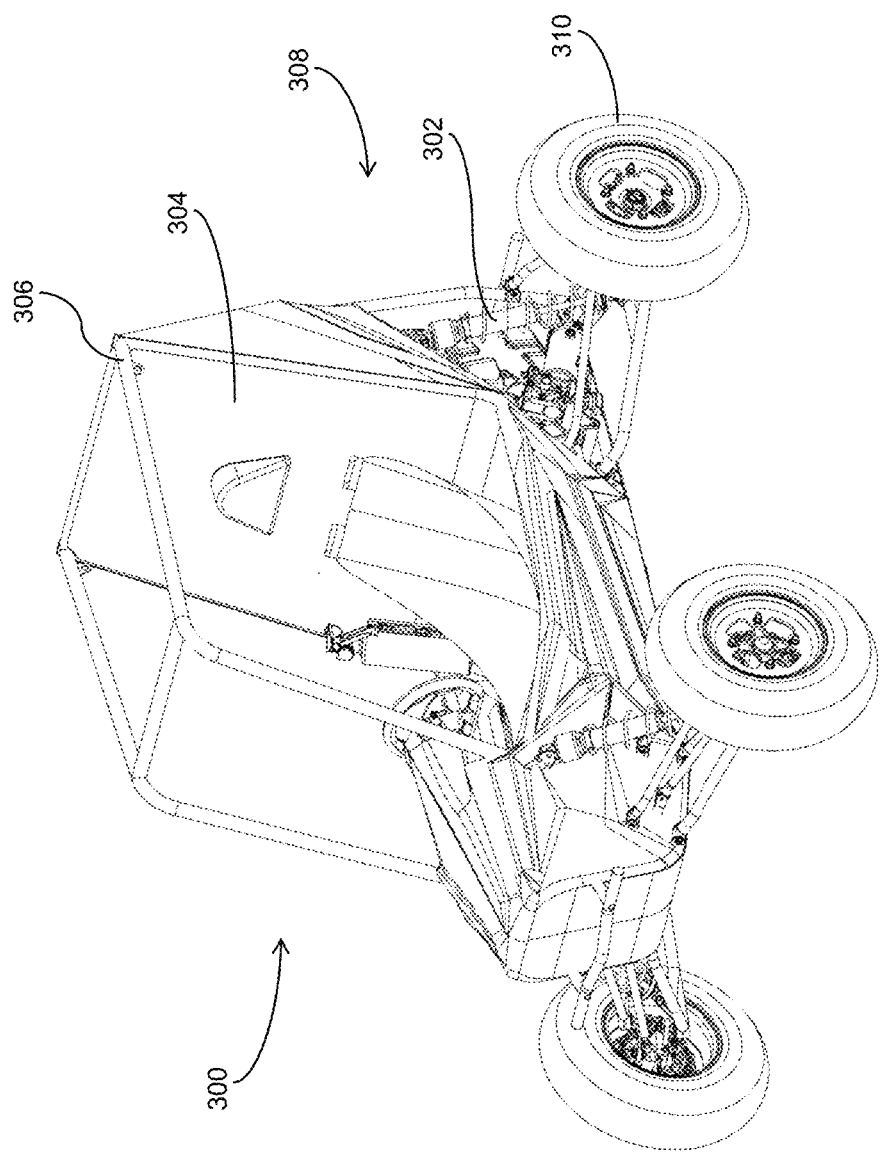
FIG. 3 presents an isometric view of an off-road vehicle having various components including a powertrain mounted thereon, according to one embodiment.

Presented in FIG. 3 there is an all-terrain vehicle (ATV) 300 that has a frame 306 shaped and sized for a person to mount the vehicle and perform off-road driving. The vehicle is powered by a powertrain 308 adapted to transmit power produced by the engine to a set of rear wheels 310. The powertrain 308 is positioned on-board the vehicle 300 behind a firewall 304, and beside a suspension system 302.

Figure 4:
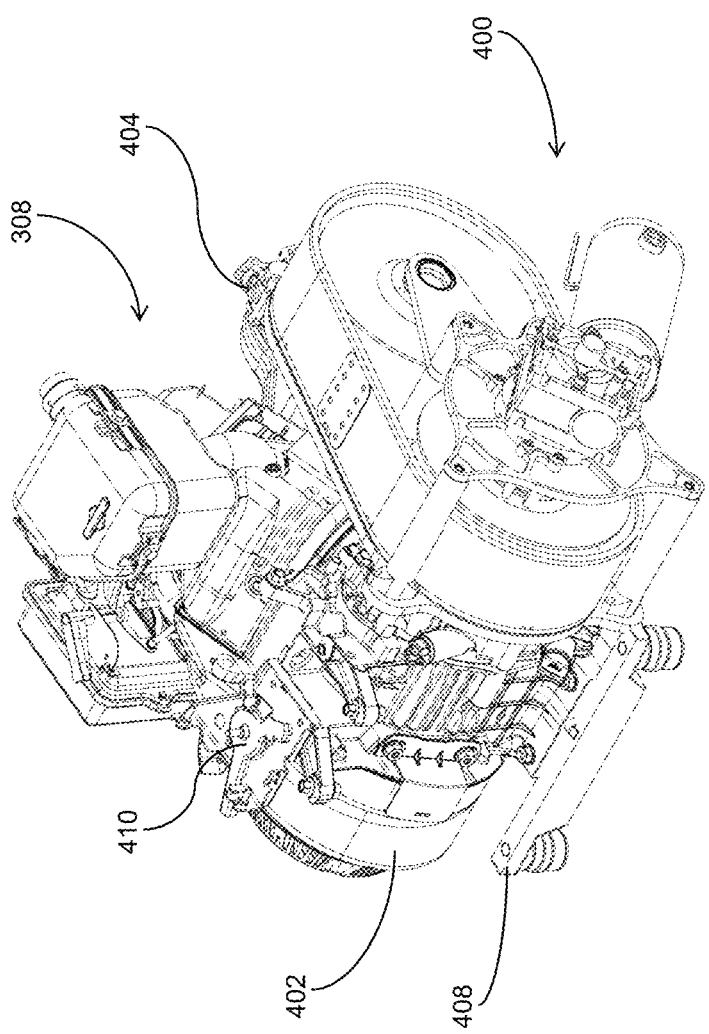
FIG. 4 presents an isometric view of the powertrain of FIG. 3, according to one embodiment.

In FIG. 4, the powertrain 308 is mounted on a sub frame 408 that is boltable to the frame 306 of the vehicle, as concurrently presented in FIG. 3. The powertrain 308 has a combustion engine 402, which is adapted to generate the required power to move the vehicle according to a throttle position 410. The generated power is transferred to an electronically controlled CVT 400. The CVT 400 is adapted to maintain the engine 402 in its efficient operating range by varying the ratio between the engine speed and the wheel speed. The CVT 400 is further adapted to transfer a resulting power to a final drive gearbox 404. The final drive gearbox 404 is adapted to transfer a resulting power to the wheels 310.

Figure 5:
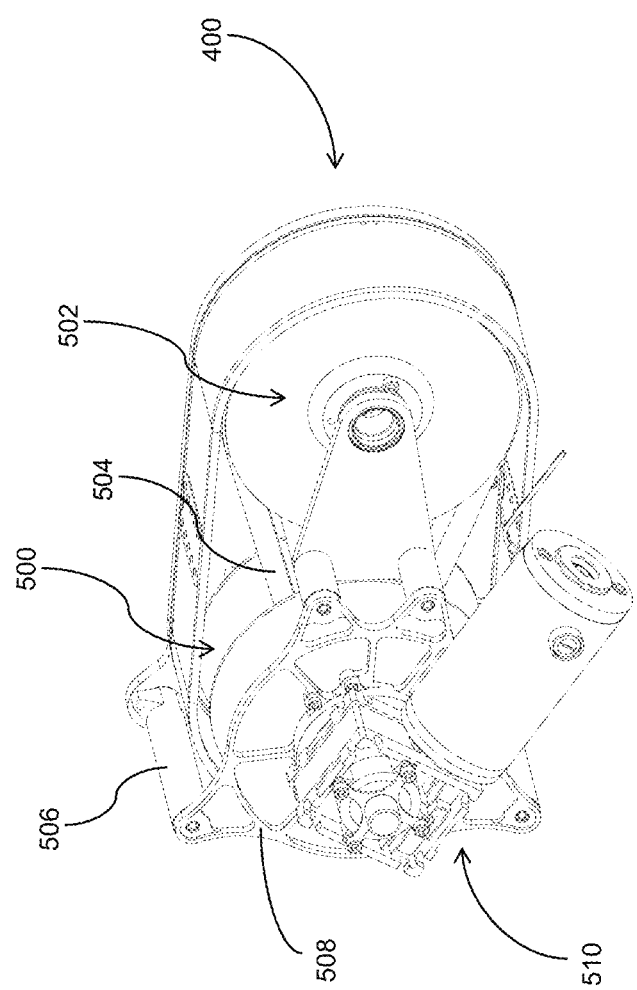
FIG. 5 presents an isometric view of an electronically controlled CVT system mounted on the powertrain of FIG. 3, according to one embodiment.

In FIG. 5 there is presented a side view of the electronically controlled CVT 400 that is isolated from the powertrain 308. The CVT has a primary pulley 500, a secondary pulley 502, a drive belt 504 and an electric gear motor associated to the primary pulley. The primary pulley is drivably connected to the engine 402 and is adapted to transfer the engine power from the primary pulley 500 to the secondary pulley 502 via the drive belt 504. The electric gear motor 510 is mounted on a front plate 508 of the CVT 400 and is adapted to electronically control an effective diameter of the primary pulley 500 that is positioned opposite the front plate 508.

It shall be recognized that the electric gear motor 510 can be replaced by any other suitable actuation device such as a rotative or a linear electric gear motor or any hydraulic actuator.

Figure 6:
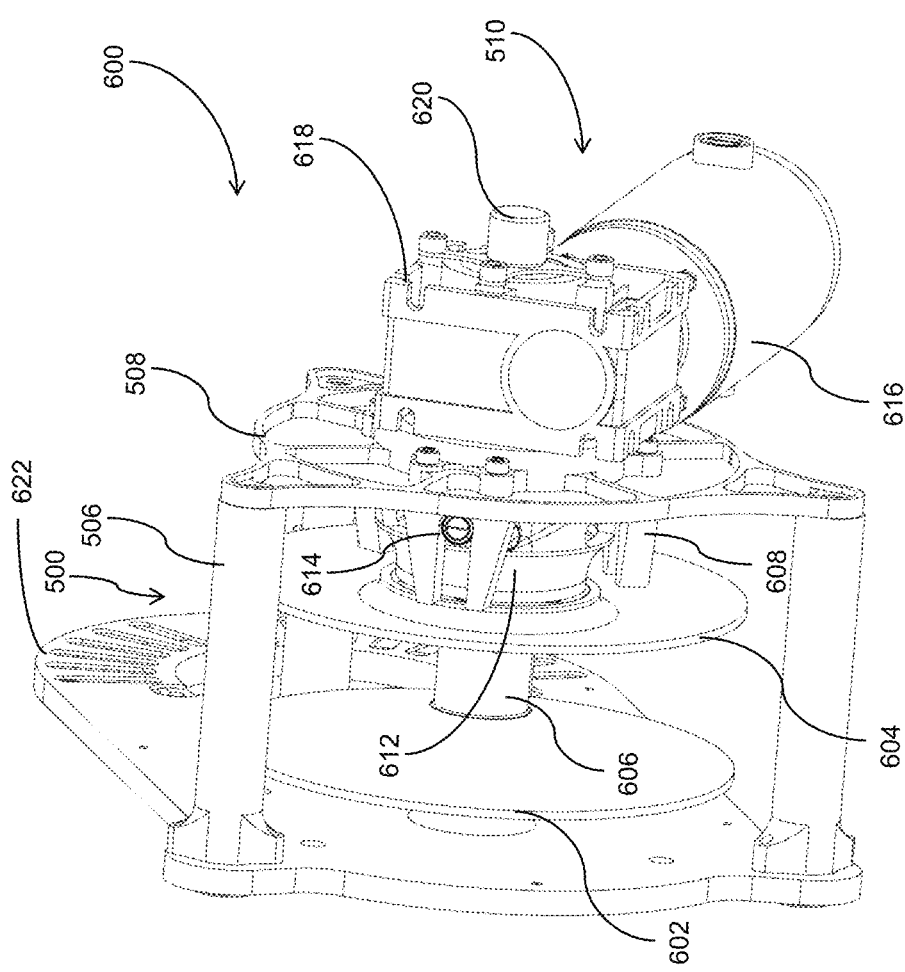
FIG. 6 presents an Isometric view of the electronically controlled CVT system of FIG. 5 showing an electronically controlled primary pulley, according to one embodiment.

FIG. 6 presents a front view of the primary pulley 500 and the gear motor 510 assembly 600. The assembly 600 has a front plate 508 and a back plate 622 that are separated by four standoff members 506 in order to protect and support the primary and secondary pulleys (500 and 502). The back plate 622 is adapted to be bolted to a flange on the engine 402. The electric gear motor 510 is bolted on the front plate 508 opposite the primary pulley 500. The primary pulley 500 has a fixed sheave 602 and a mobile sheave 604 mounted on a primary shaft 606. The fixed sheave 602 is fixedly mounted on the primary shaft 606. The mobile sheave 604 is axially movable along the primary shaft 606 and is actuatably connected to the electric gear motor 510 in order to increase or decrease an effective diameter of the primary pulley by axially moving the mobile sheave towards the fixed sheave or by separating the mobile sheave away from the fixed sheave. Both fixed and mobile sheaves (602 and 604) have a tapered shape allowing the belt 504 to travel around the primary pulley between an effective wide diameter and an effective narrow diameter by travelling near an edge of the sheaves (602 and 604) or closer to the axis of rotation (i.e. center) of the sheaves (602 and 604). As the mobile sheave 604 is moved towards the fixed sheave, strap 504 rotates nearer to the edge of the sheaves and the belt 504 is thereby extended to rotate around an effective wider diameter of the primary pulley 500. As the mobile sheave 604 is moved away from the fixed sheave, the belt 504 rotates nearer to the axis of rotation of the primary pulley 500 and tension in the strap 504 is maintained by an increasing diameter in the secondary pulley 502. An increase or decrease of the diameter of the primary pulley produces an increase or a decrease of the transmission ratio, depending on the mathematical ratio with respect to the diameter of the secondary pulley 502. The power take-off shaft from the engine 402 is connected to shaft 606 and they both turn at the same speed according to a mechanical link. The power of the engine 402 is transmitted to the drive belt 504 by both the fixed sheave 602 and the mobile sheave 604. The fixed sheave 602 is press-fit mounted on the shaft 606. The mobile sheave 604 is allowed to move axially over the shaft 606 and still transmit the power of the engine by having splines designed to slide under load.

Further presented in FIG. 6, the CVT 400 has a cam 612 that is adapted to push on the mobile sheave 604. The cam 612 is connected to the mobile sheave 604 with a bearing system in order to prevent the rotation of the sheave 604 to be transferred to the cam 612. Indeed, the cam 612 is immobilized by three cam followers 614 that are bolted on the cam 612 and that roll between corresponding cam forks 608 which are bolted on the front plate 508.

As skilled person will recognise that other devices for immobilising the cam 612 is possible and still provide the same effect as the cam followers 614 and the cam forks 608 assembly.

Figure 7:
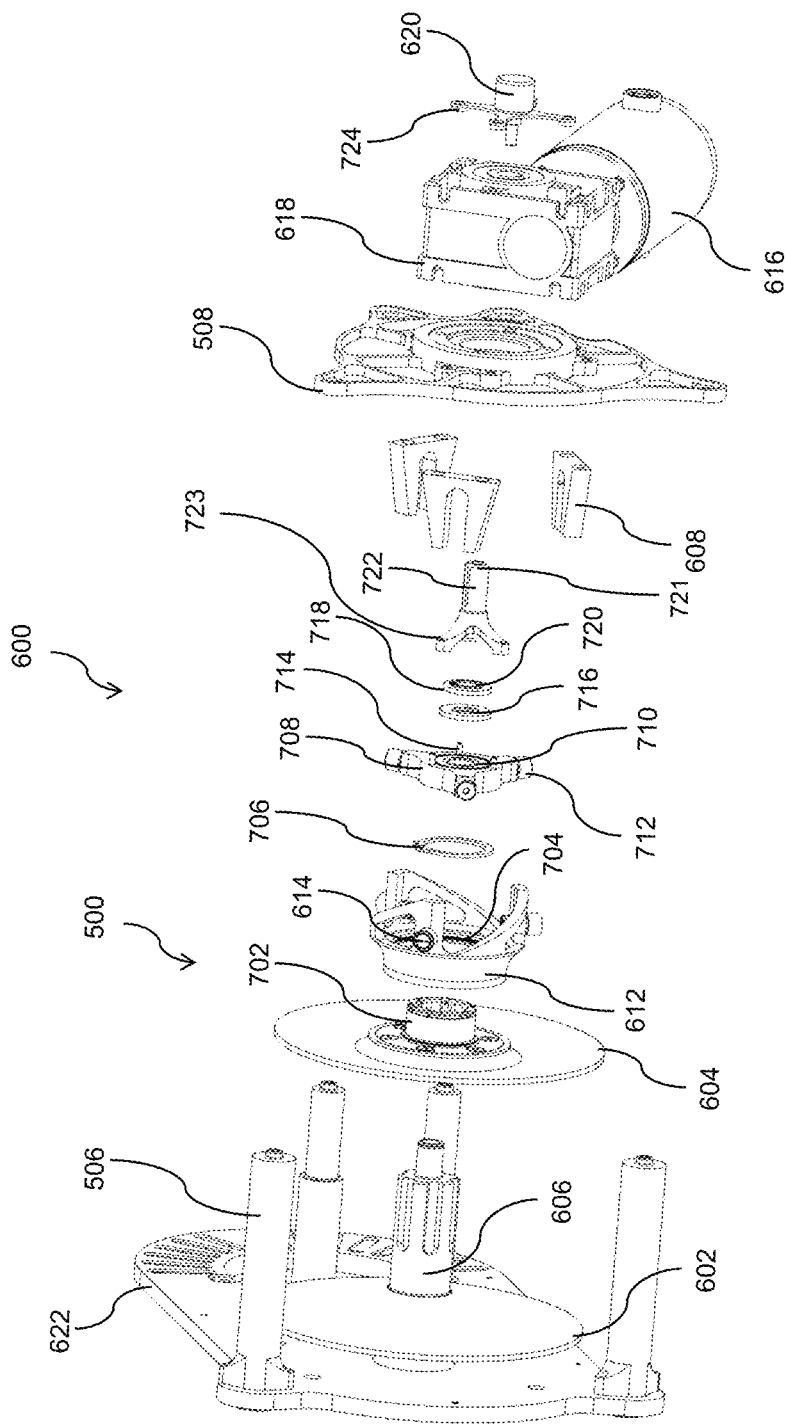
FIG. 7 presents an exploded view of the electronically controlled CVT system of FIG. 6, according to one embodiment.

FIG. 7 is an exploded view of the front view of the assembly 600. The gear motor 510 has an embedded system including a firmware and various sensors as a potentiometer 620 that is adapted to detect a position of the primary pulley 604. The embedded system of the gear motor 510 determines actuation instructions for axially moving the mobile sheave 604 according to detected measurements provided by the various sensors. According to the actuation instructions, the gear motor 510 is adapted to provide a rotational movement to the actuator shaft 722. The cam 612 transfers the received rotational movement from the actuator shaft 722 into a translational or axial movement of the mobile sheave 604.

Figure 8:
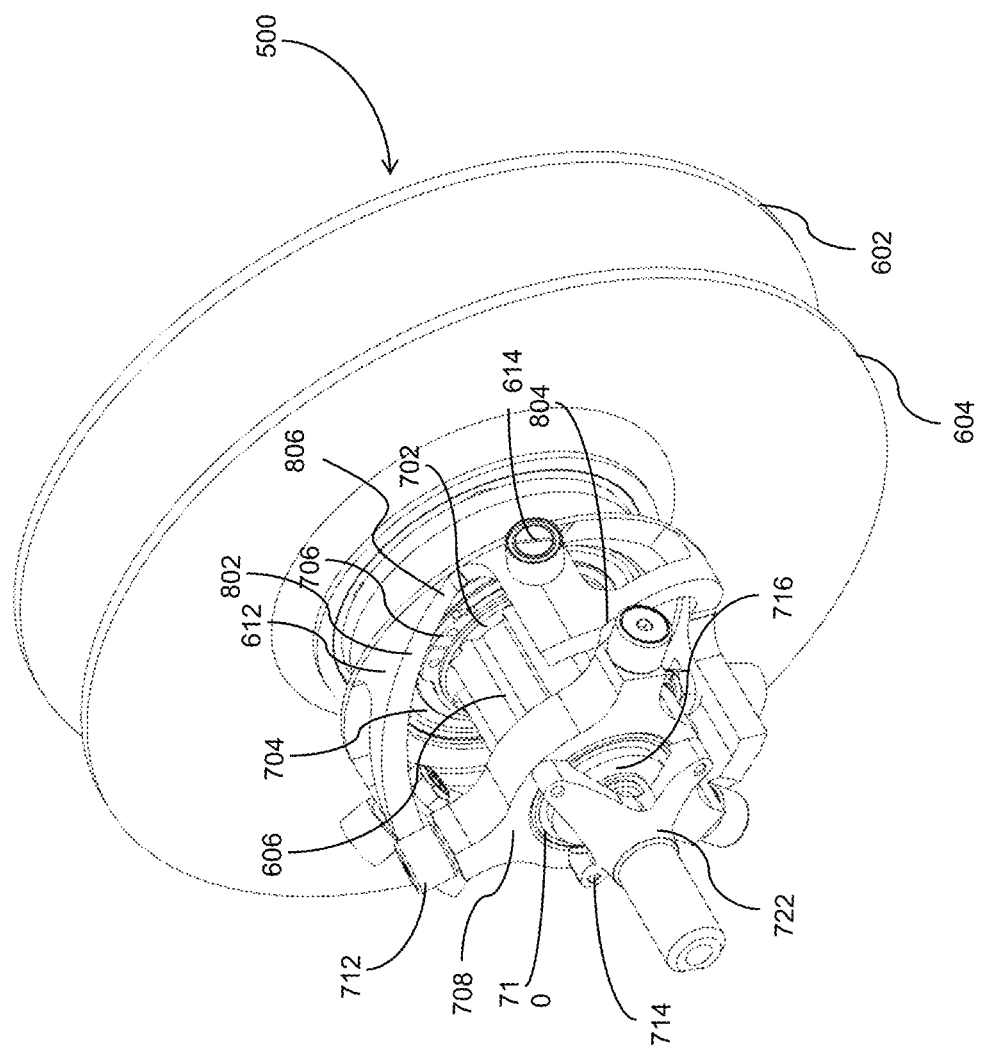
FIG. 8 presents an isometric view of the primary pulley of FIG. 6 positioned in a closed position, according to one embodiment.

As further presented in FIG. 7 and also presented in FIG. 8, in order to provide the rotational movement to the cam, the cam has an actuator shaft 722 that is connectable to the gear motor 510 at a first position 721 and connectable to a roller holder 708 at a second position 723. According to one embodiment, at the first position 721, the actuator shaft 722 is connected to an output of a worm gear reducer 618 of the gear motor 510. At the second end 723, the actuator shaft 722 is connected to a roller holder 708. According to one embodiment, the actuator shaft 722 define holes that are adapted to receive pins 714, such as Dowell pins, that are press fitted into the roller holder 708. The pins 714 slide into the holes of the actuator shaft 722 and ensure the transfer of the rotational movement from the gear motor 510 to the roller holder 708. The roller holder 708 is mounted onto an end shoulder 607 of the primary shaft 606 and a bearing, such as ball bearing 710 ensures the relative rotational speed difference between the primary shaft 606 and the roller holder 708.

It shall be recognized that other methods of connecting the actuator shaft 722 to the roller holder are possible, without departing from the scope of the present CVT 400.

Further presented in FIG. 7, according to one embodiment, a retaining ring 720 and a washer 718 position the roller holder 708 in order to prevent the roller holder from sliding out of the primary shaft 606 due to the axial thrust load generated by the cam followers 712 that are adapted to roll on respective ramps 802 of the cam 612.

It shall be recognized that other means for holding the roller holder 708 in place within the cam 400 are possible, without departing from the present CVT.

The cam 612 is mounted on a drive flange 702 of the mobile sheave 604 and is kept in place by a retaining ring 706, a ball bearing 704 ensures the relative rotational speed difference between the cam 612 and the drive flange 702. As the cam 612 is mounted on a bearing 704, to ensure that the cam followers 712 from the roller holder 708 generate an axial movement, the cam forks 608 serve as a guide for the track roller 614. The axial movement generated by the cam 612 is then transferred to the driving flange 702. This same flange 702 also transfers a part of the power, in the form of a rotational speed and torque to the strap 504, by either being bolted on the mobile sheave 604 and having splines designed to slide under load that match with the splines from the primary shaft 606.

It shall be recognized that the track roller 614 can be replaced by any other device that could be guided by the cam forks 608 such as pegs, without departing from the scope of the present. Moreover, a skilled person would recognize that the track roller 614 and the cam forks 608 are interchangeable such that the cam forks could be attached to the cam 612 and the track roller 614 could be affixed to the front plate 508.

FIG. 8 is an isometric view of the cam and primary pulley 500 assembly positioned in the full shifted position or closed position. The actuator shaft 722 is connected to the roller holder 708. The roller holder 708 is rotated in order for the cam followers 712 to roll over the ramp 802 of the cam 612 up to a top portion 804 of the ramp 802. As the cam followers 712 roll towards the top portion 804, an axial thrust is generated and the driving flange 702 that is bolted to the mobile sheave 604 is moved towards the fixed sheave 602. The driving flange 702 transmits part of the torque to the mobile sheave 604 due to the splines that corresponds to the splines from the primary shaft 606.

A skilled person would recognize that the cam followers 712 could be replaced by pegs shaped and sized to slide over the respective ramps 802, without departing from the present.

Figure 9:
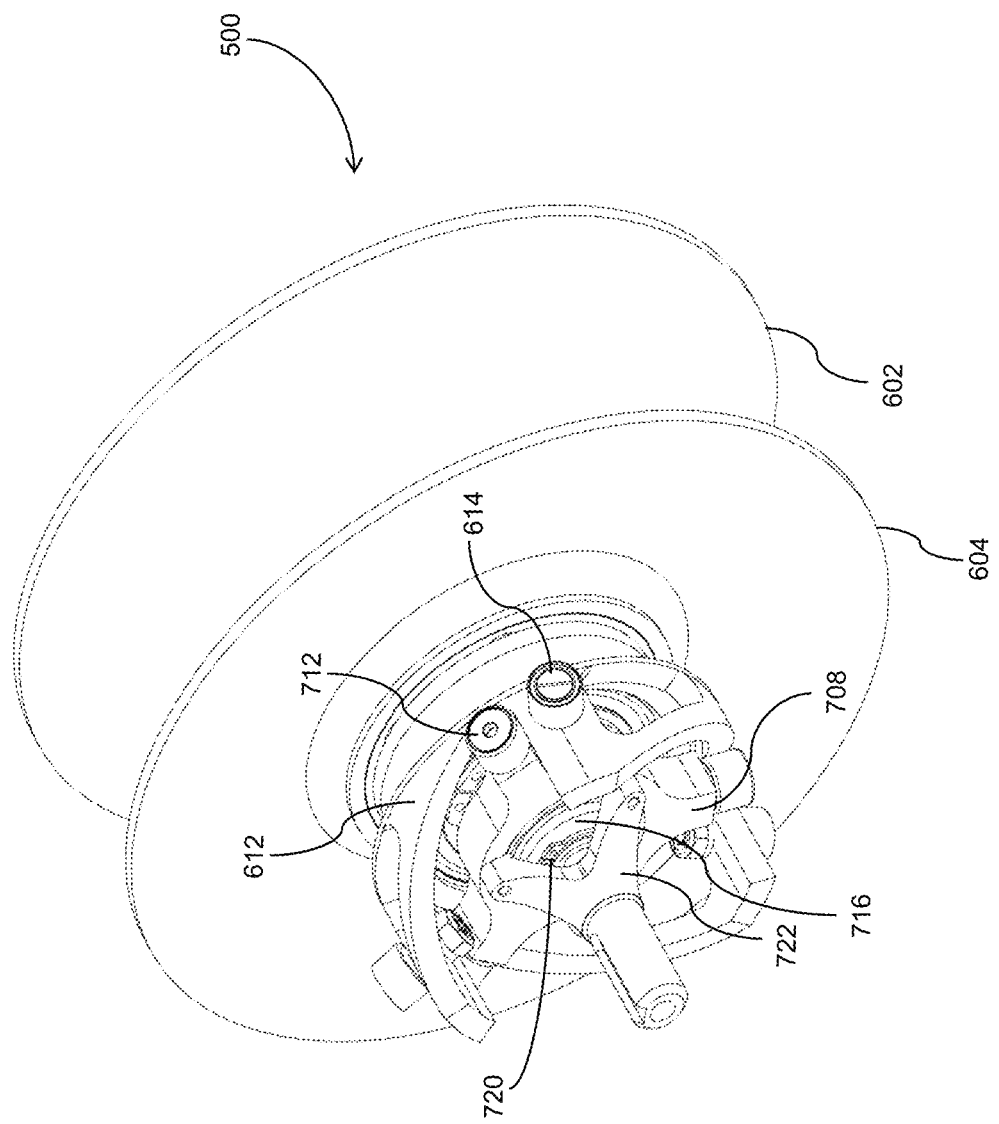
FIG. 9 presents an isometric view of the primary pulley of FIG. 6 positioned in an open position, according to one embodiment.

FIG. 9 is an isometric view of the cam and primary pulley 500 assembly positioned in the first shifted position or open position. The actuator shaft 722 is connected to the roller holder 708. The roller holder 708 is rotated in order to roll the cam followers 712 over the ramp 802 of the cam 612 down to a bottom portion 806 of the ramp 802. As the cam followers 712 roll towards the bottom portion 806, an axial thrust is generated and the driving flange 702 that is bolted to the mobile sheave 604 is moved away from the fixed sheave 602. The axial thrust generated by the cam induces a reaction thrust in an opposite direction. In order to prevent the roller holder 708 to move towards the gear motor 510, a retaining ring 720 and a washer 716 are used to handle the opposite reaction thrust.

Figure 10:
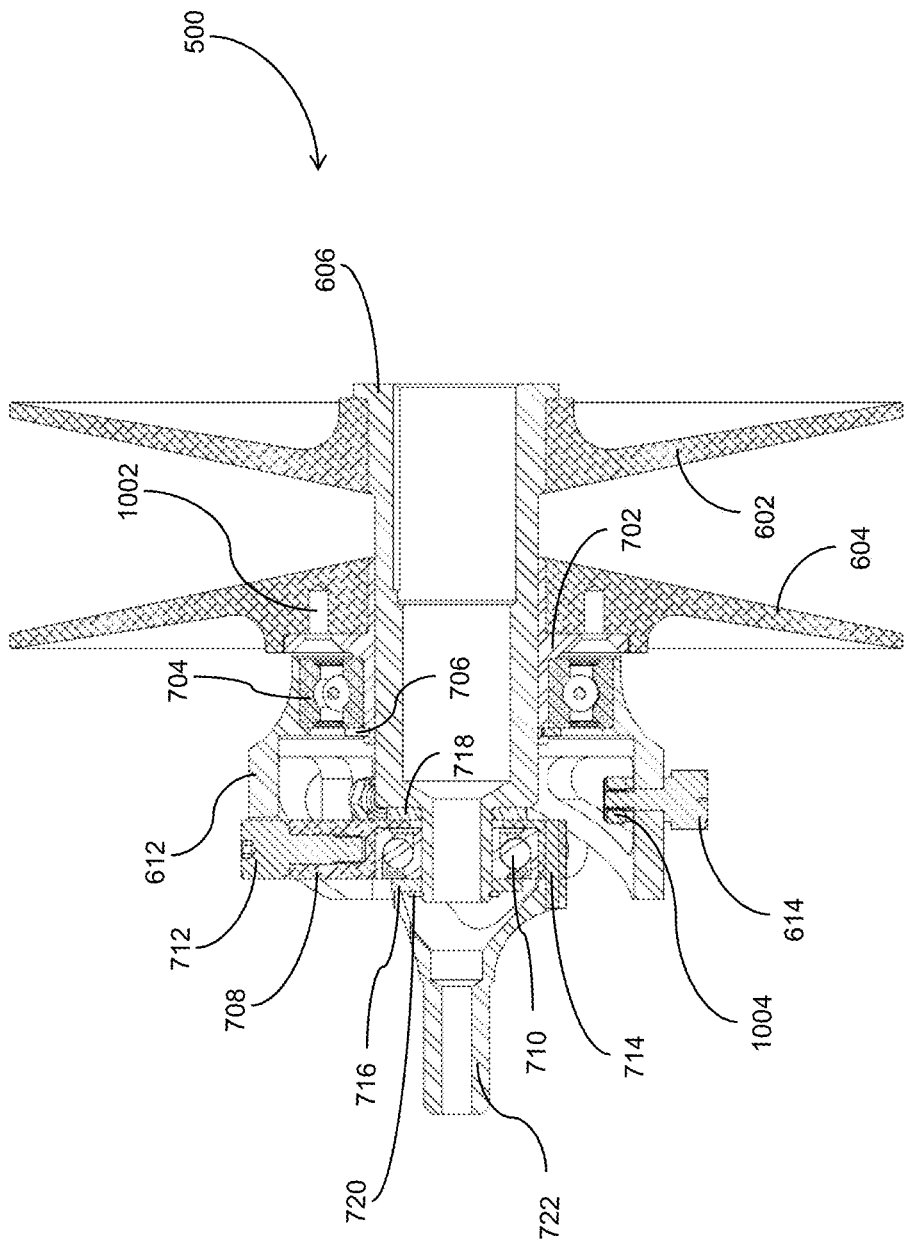
FIG. 10 presents a cross-sectional view of the primary pulley of FIG. 9 as positioned in the open position with a primary clutch, according to one embodiment.

FIG. 10 is a cross-sectional view of the primary clutch 500 in the open position as concurrently presented in FIG. 9. The primary shaft 606 defines a keyway opening adapted to receive a power take off of the engine 402 and transfer the engine power to the primary shaft 606. The fixed sheave 602 is press fittedly mounted on the shaft 606 in order to transfer the power of the engine to the strap 504. The mobile sheave 604 is also adapted to transfer part of the engine power to the strap 504 since the driving flange 702 is connected to the mobile sheave 604 for instance with a screw 1002. The driving flange 702 is sized and shaped to slide precisely over the shaft 606 in a sliding fit. The driving flange 702 is driven axially by the cam 612 and the bearing 704 ensures the relative rotational speed between the driving flange 702 and the cam 612. The retaining ring 706 positions the bearing 704 allow the bearing 704 to be assembled and disassembled. The axial thrust is provided by cam followers 712 that roll over the ramp 802 of the cam 612. The opposite axial thrust is absorbed by the roller holder 708 thrusting against the bearing 710 that sits against the washer 716 and the retaining shaft 722. A plastic washer 718 is inserted between the roller holder 708 and the end shoulder 607 of the primary shaft 606 in order to protect both parts (708 and 606), when the roller holder 708 is moved into the open position, as concurrently presented in FIG. 9.

It shall be recognized that the CVT 400 or the pulley 500 are adapted to be installed in various other types of power equipment that require a power transmission, in addition to the vehicle 300, such as in a snow blower, a generator, a snowmobile, a truck, a car, a scooter, a tractor, various types of all-terrain vehicles (ATVs), etc.

One advantage of this CVT 400 or this pulley system 600 is that the actuation components (gear motor 510, shaft 722 and cam 612) are all co-centrically aligned with the primary shaft of the pulley 500. By having all the parts co-centrically aligned with the axis of rotation of the primary shaft, all actuation components are coaxial and have a same axis of reference. The stationary components (cam 612) or the components (shaft 722 and holder 708) that are turning at a different speed, are mounted on a bearing (704 and 710) in order to maintain the same axis of reference. This allows to maintain stability within the pulley system 600 and diminishes vibrations.

Moreover according to one embodiment, standard bearings (704 and 710) are used in the pulley 600, providing greater durability and facilitating the maintenance of the pulley 600 since standard bearings are cheaper to purchase when replacement is required. Also, the bearings (704 and 710) are easily accessible, only the corresponding retaining rings (706 or 720) need to be removed in order to replace the bearings (704 and 710).

It shall further be recognized that the cam system can be inverted. Instead of having the roller holder 708 actuated by the gear motor 510 and having a fixed cam 612, the cam 612 can be connected to the gear motor 510 and the roller holder 708 could be connected to the movable sheave 604.

Figure 11:
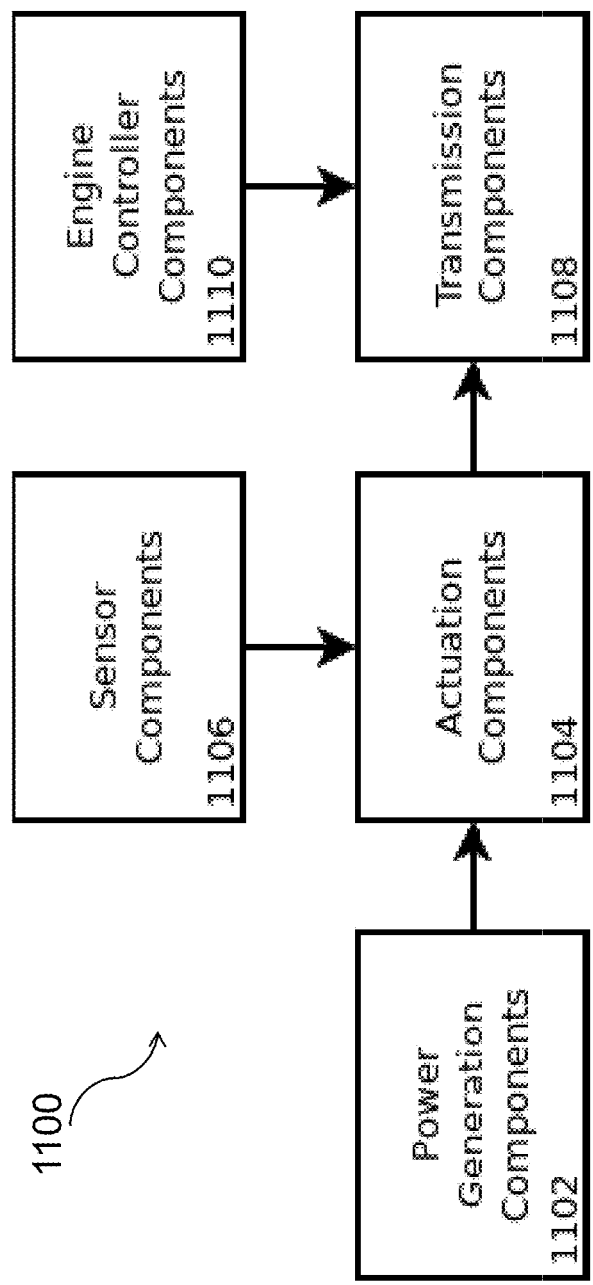
FIG. 11 presents a general block diagram of the powertrain components of the vehicle of FIG. 3, according to one embodiment.

Presented in FIG. 11 is a general block diagram depicting powertrain components 1100 of the vehicle 300, according to one embodiment. The powertrain components 1100 include power generation components 1102 adapted to power actuation components 1104. The actuation components 1104 are adapted to actuate transmission components 1108 according to measurements received from sensor components 1106. Moreover, the transmission components 1108 are controllable by engine controller components 1110.

Figure 12:
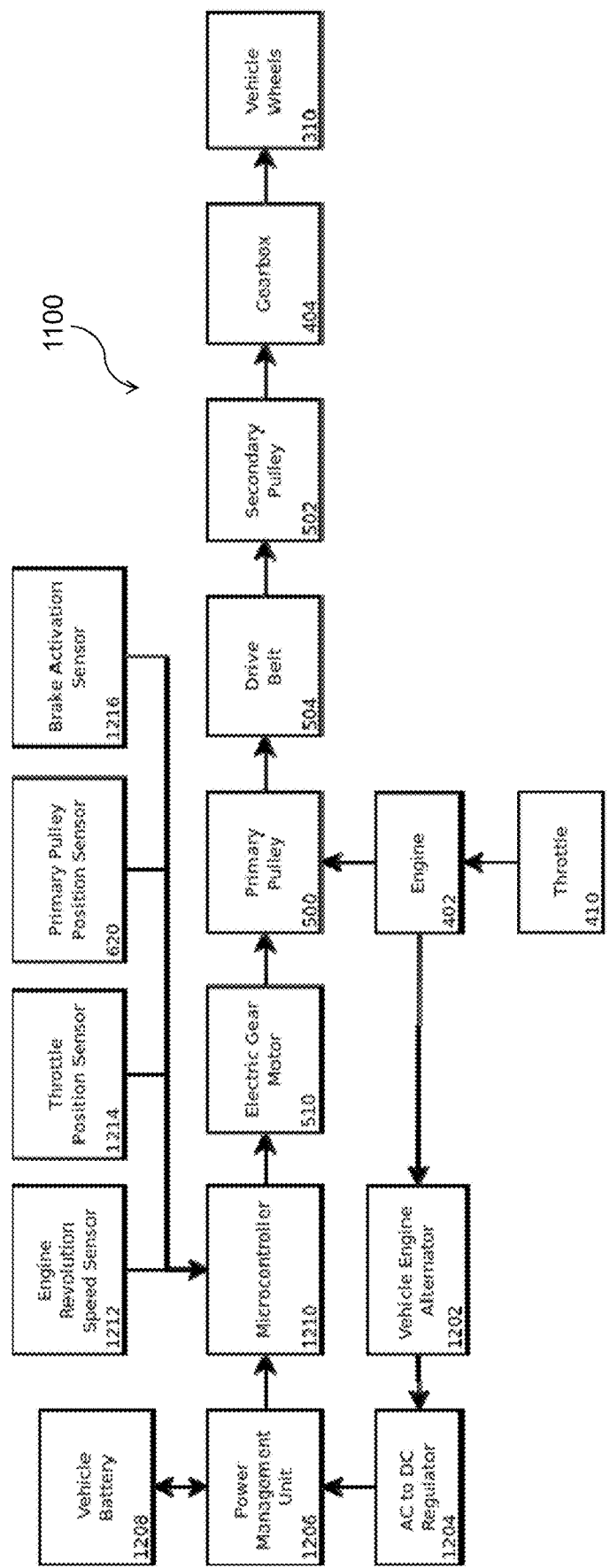
FIG. 12 presents a detailed block diagram of the powertrain components of FIG. 11, according to one embodiment.

Presented in FIG. 12, is a detailed block diagram of the powertrain components 1100, according to one embodiment. The power generation components 1102 include an engine alternator 1202, an AC to DC regulator 1204, a power management unit 1206 and a battery 1208. The engine alternator 1202 generates an alternating current power that is regulated by an alternate current (AC) to direct current (DC) regulator 1204. The power management unit 1206 manages the redirection of the power to and from the vehicle battery 1208 and provides power to actuation components of the vehicle 300. The actuation components 1104 include a microcontroller 1210 and an electric gear motor 510 that are adapted to actuate the transmission components 1108 according computed signals received from the sensor modules 1106. The sensor components 1108 include an engine revolution speed sensor 1212, a throttle position sensor 1214, a primary pulley position sensor 620 and a brake activation sensor 1216. The engine revolution speed sensor 1212 is a Hall effect sensor that is capable of detecting magnetic fields produced by the magnets fixed around the primary pulley 500. The throttle position sensor 1214 and primary pulley position sensor 620 are potentiometers that provide a direct linear voltage signal according to position measurements of the primary pulley 500. The primary pulley 500 position measurements indicate the distance between the mobile sheave 604 and the fixed sheave 602. The brake activation sensor 1216 is a simple switch fixed on brake pedal that provides the brake activation state such as with a Boolean state.

The transmission components 1108 are controlled by the actuation components 1104 according to the engine controller components 1110. The transmission components 1108 include the primary pulley 500, the drive belt 504, the secondary pulley 502 and the gear box 404 that is connected to the vehicle wheels 310 as previously described. The primary pulley 500 position determines the continuously variable transmission (CVT) clutching operation, the shifting level of the CVT, and applies relative clamping force on the drive belt 504 that transmits the power to the secondary pulley 502. The torque transmission ration from the primary pulley 500 to the secondary pulley 502 depends on the current ratio between both pulley diameters and the drive belt 504 slip loss. A fixed ratio gearbox 404 is used to transfer the final torque to the vehicle wheels 310. The engine controller components 1110 include an engine 402 and a throttle 410. The throttle 410 is actuated by the driver of the vehicle 300 and the engine 402 is controlled according to a position of the throttle 410. Indeed, the engine 402 output power depends on the throttle 410 position controlled by the driver according to the desired vehicle behavior.

Figure 13:
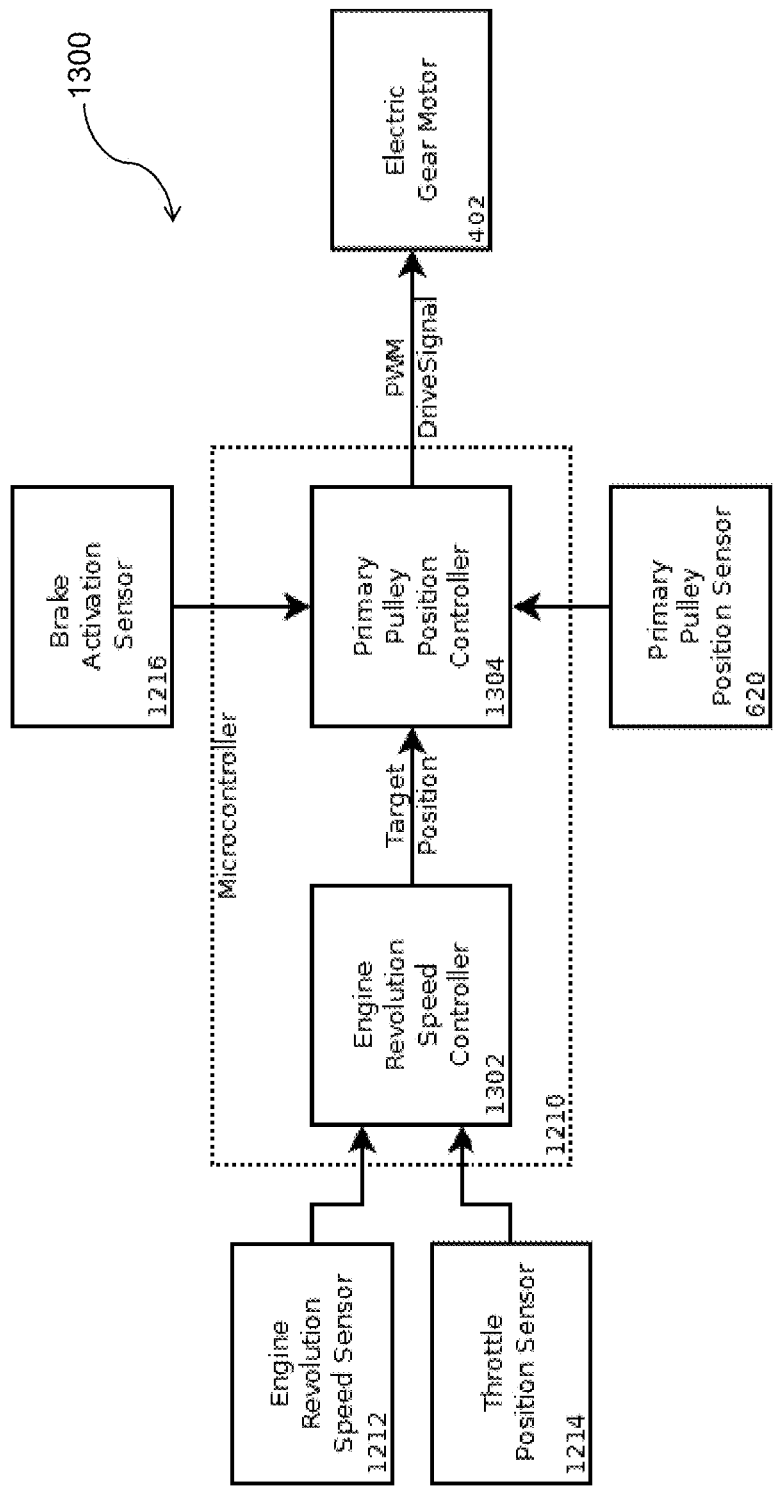
FIG. 13 presents a block diagram of control components of the powertrain components of FIG. 11, according to one embodiment.

FIG. 13 presented the control components 1300 according to one embodiment, which include the actuation components 1104 and sensor components 1108 in order to control the transmission components 1108. The engine revolution speed controller 1302 and the primary pulley position controller 1304 are implemented into the microcontroller 1210 which acquires properly the sensor components signals. The engine revolution speed controller 1302 determines the primary pulley 500 target position according to the signals provided by the engine revolution speed sensor 1212 and the throttle position sensor 1214. The primary pulley position controller 1304 use the current primary pulley position value from the primary pulley position sensor 620 and the brake activation state from the brake activation sensor 1216 to determine the pulse-width modulation (PWM) signal driving the electric gear motor 402 in order to reach the primary pulley target position.

Figure 14:
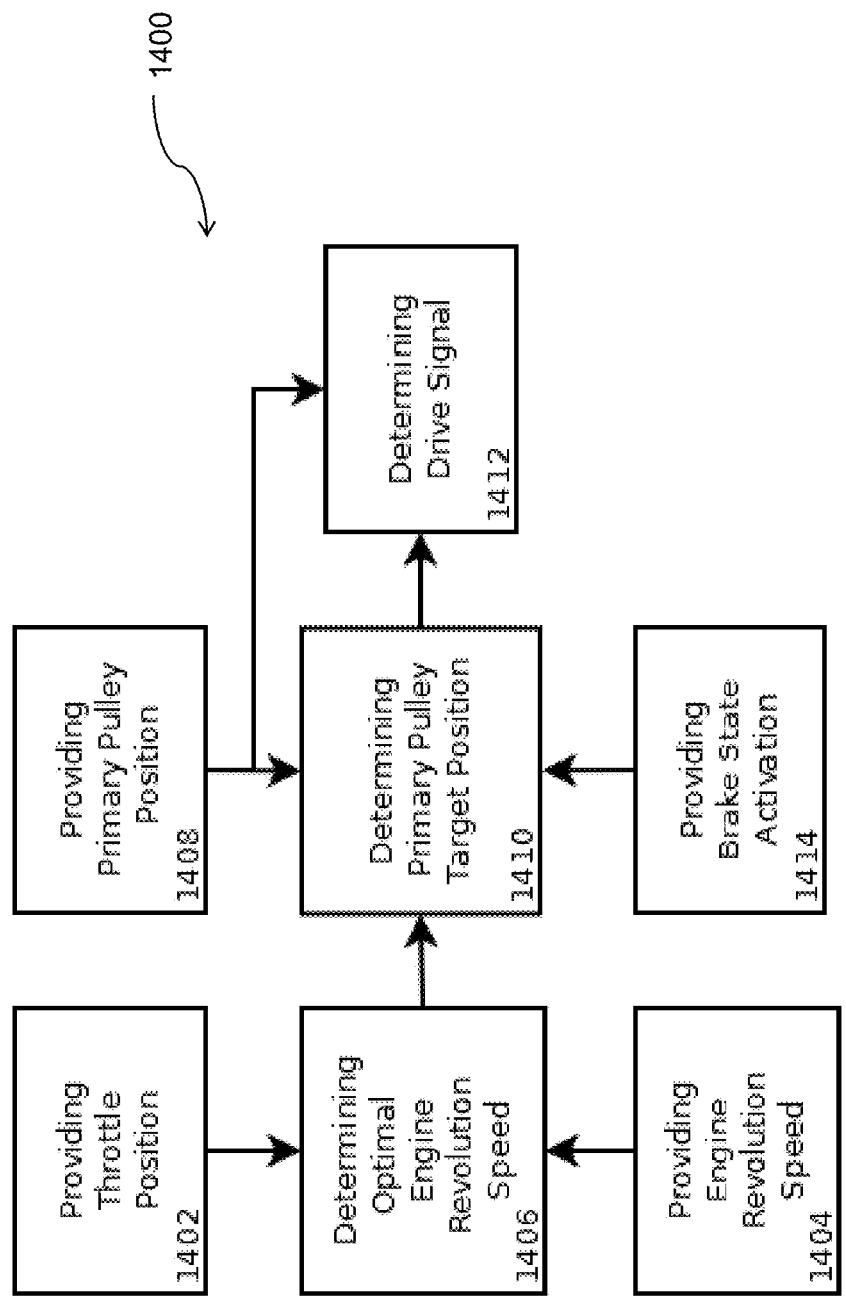
FIG. 14 presents a general block diagram of a method of controlling the powertrain of FIG. 11, according to one embodiment.

FIG. 14 presented briefly the main operations of the control method 1400. Basically, the control method must provide the sensor information in order to determine the control components 1300 targets. By providing throttle position 1402 and providing engine revolution speed, the control method 1400 is able to determining optimal engine revolution speed 1406. In same, by providing the primary pulley position 1408 and providing brake state activation 1414, the control method 1400 determining the primary pulley target position 1410 and determining the drive signal 1412 in order the reach the optimal engine revolution speed.

Figure 15:
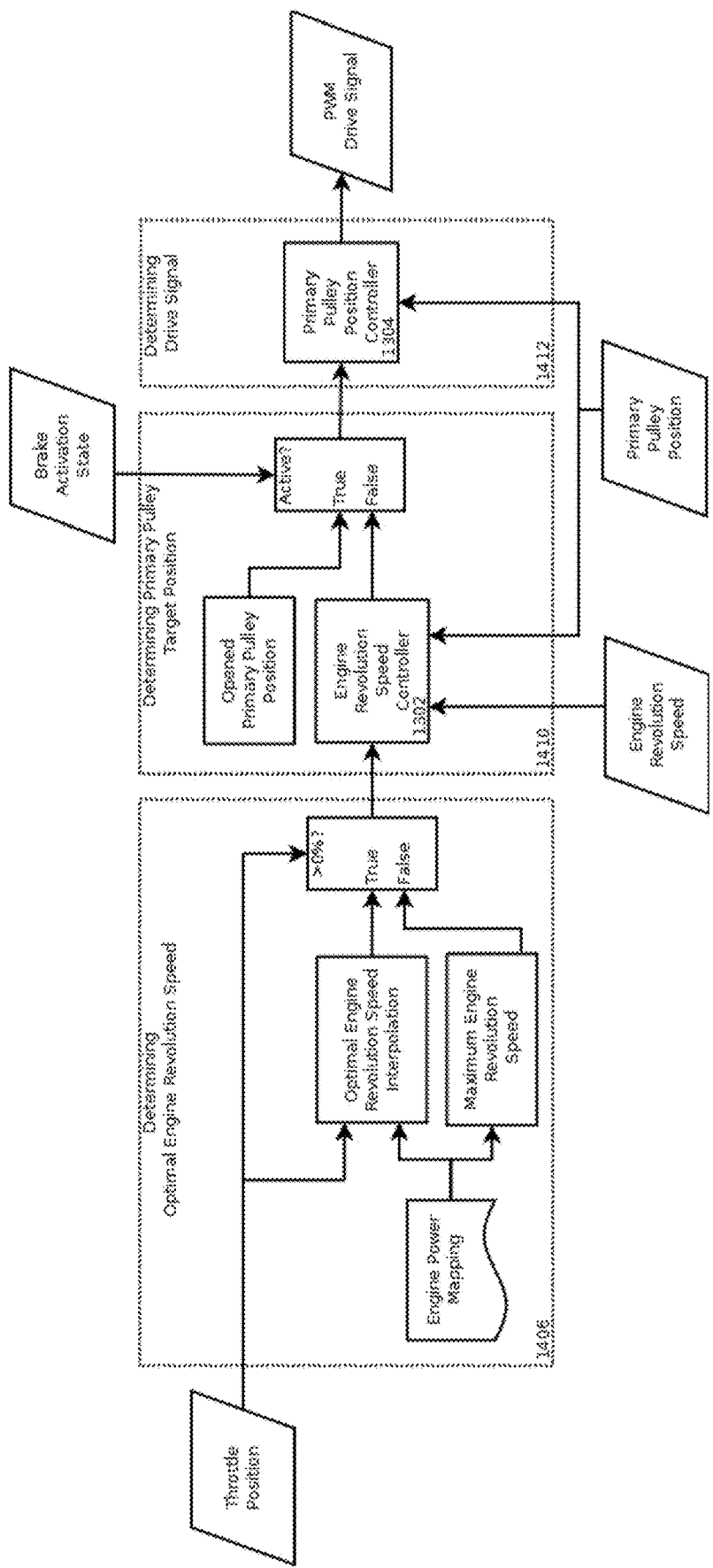
FIG. 15 presents a detailed block diagram of the control method of FIG. 14, according to one embodiment.
Figure 7:
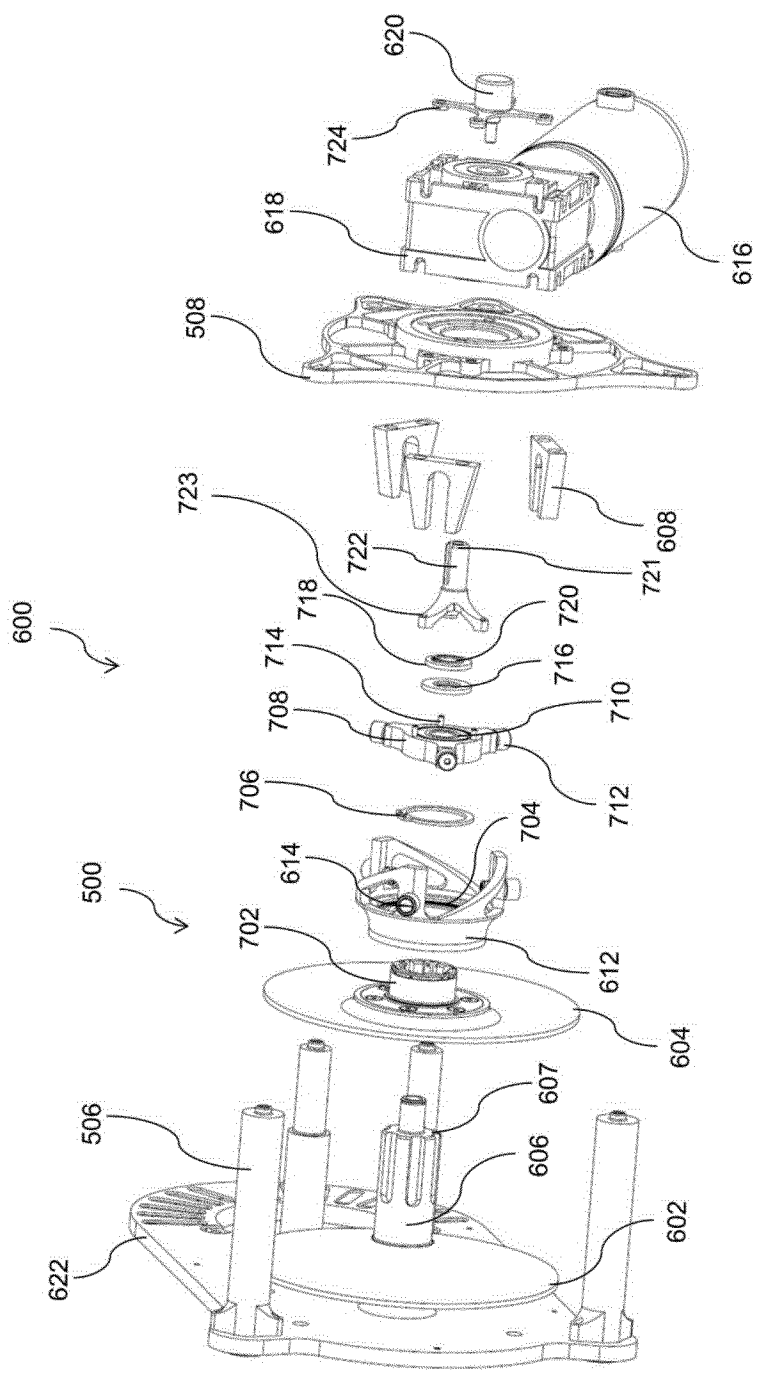
Figure 10:
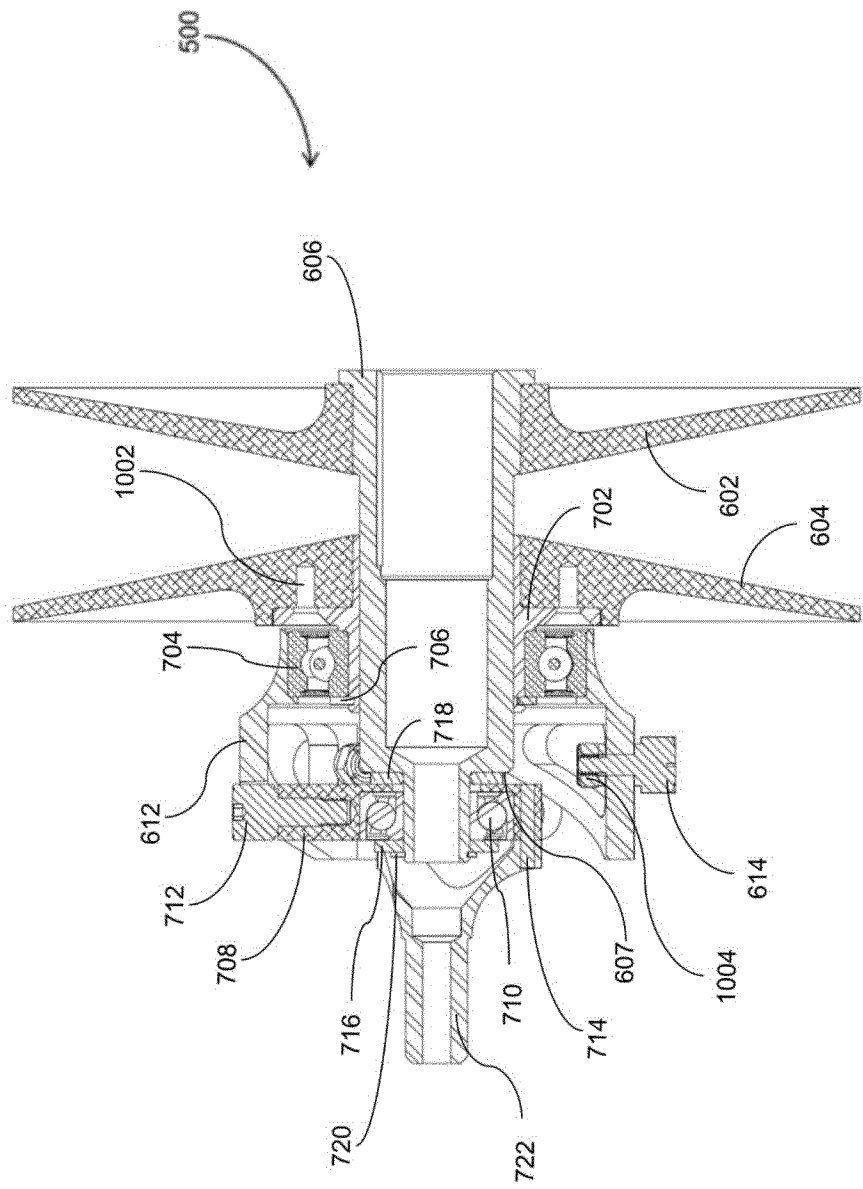

According to one embodiment, the FIG. 15 presents in details the control method 1400. The throttle position information is processed to interpolate into the power engine mapping to provide the optimal engine revolution speed to the engine revolution speed controller 1302. In the case of a null throttle position 1100 (0%), the engine revolution speed target is defined as the maximum engine revolution speed value. According to the engine revolution speed and current primary pulley position, the engine revolution speed controller 1302 defines a new primary pulley target position. In case of brake activation, the primary pulley target position is defined as the entirely opened primary pulley position value (no clutching). The primary pulley position controller 1304 determines a pulse-width modulation (PWM) signal to drive of the electric gear motor 402 according to the current primary pulley position in order to achieve the new primary pulley target position.

As can be noticed, the control method 1400 does not take into account the vehicle speed or the actual CVT ratio, only the actuated pulley position and the engine revolution speed are sensed. In addition, according to some embodiments, the throttle position and brake activation state, as controlled by the vehicle operator, are measured or detected in order to control the mobile sheave 604.

The control method is simplified by the mechanical assembly advantage of being on the same axis which provides a direct action of the actuation drive on the pulley position which limits the need of reducing stages as seen on others controlled CVT systems. This characteristic increases the efficiency of the CVT system and limits the number of parts to fix, particularly in the actuation drive to the mechanical assembly. Moreover, the transfer function between the pulley position and the angle of the actuation shaft follow a linear relation, this simplifies the computing and the control algorithm.

The invention claimed is:

1. An electromechanically actuated continuously variable transmission (CVT) for a vehicle comprising:
   a secondary pulley that is drivably connectable to a propulsion system of the vehicle;
   a primary pulley that is adapted to drive the secondary pulley with a drive belt that rides on the secondary pulley and the primary pulley, the primary pulley being drivably connectable to an engine of the vehicle, the primary pulley comprising:
      a primary shaft;
      a fixed sheave fixedly mounted on the primary shaft and having a fixed tapered shape portion;
      a mobile sheave movably mounted on the primary shaft and having a mobile tapered shape portion, the mobile sheave being mounted on the primary shaft such that the fixed tapered shape portion and the mobile tapered shape portion form a riding path for the drive belt and being axially movable with respect to the primary shaft such as to vary an effective diameter of the primary pulley by increasing or decreasing an axial space between the mobile sheave and the fixed sheave;
      a cam system rotatably connected to the mobile sheave and adapted to provide an axial movement to the mobile sheave in order to increase or decrease the axial space between the mobile sheave and the fixed sheave; and
      an actuation device having a drive motor and an electronic controller adapted to receive sensor input from an engine speed sensor, a throttle position sensor and a mobile sheave position sensor, said drive motor being connected to the cam system and adapted to actuate the cam system with a torque movement, according to a revolution speed of the engine, a throttle position and an actual position of the mobile sheave.

2. The electromechanically actuated CVT as claimed in claim 1 wherein the cam system has a cam that is rotatably connected to the mobile sheave and that defines a plurality of inclined peripheral ridges adapted to rotatably and peripherally guide corresponding cam followers from a lower position to an elevated position, the lower position being in proximity with the mobile sheave and the elevated position being in proximity with the actuation device, wherein the cam followers are mounted on a roller holder that is rotatably mounted on the primary shaft.

3. The electromechanically actuated CVT as claimed in claim 2 wherein the roller holder is connectable to an actuator shaft that is rotatably controlled by the actuation device.

4. The electromechanically actuated CVT as claimed in claim 3 wherein the roller holder is axially maintained in place on the primary shaft between a shoulder of the primary shaft and a holder retaining ring.

5. The electromechanically actuated CVT as claimed in claim 2 wherein the cam has mounted thereon a plurality of track rollers that are adapted to engage corresponding stationary fork members each defining a track adapted to axially guide the track rollers from a distal position to a proximal position with respect to the fixed sheave as the cam followers are guided respectively from the lower position to the elevated position.

6. The electromechanically actuated CVT as claimed in claim 2 wherein the cam is rotatably mounted on a drive flange of the mobile sheave and is axially maintained in place with respect to the mobile sheave, by a cam retaining ring.

7. The electromechanically actuated CVT as claimed in claim 1 wherein the actuation device is an electric gear motor.

8. A pulley for a continuously variable transmission (CVT) comprising:
   a main shaft;
   a fixed sheave fixedly mounted on the main shaft and having a fixed tapered shape portion;
   a mobile sheave movably mounted on the main shaft and having a mobile tapered shape portion, the mobile sheave being mounted on the main shaft such that the fixed tapered shape portion and the mobile tapered shape portion form a riding path for a drive belt and being axially movable with respect to the main shaft such as to vary an effective diameter of the pulley by increasing or decreasing an axial space between the mobile sheave and the fixed sheave;
   a cam system mounted at one end via a bearing system fitted around said main shaft to said mobile sheave, said cam system being adapted to provide an axial movement to the mobile sheave in order to increase or decrease the axial space between the mobile sheave and the fixed sheave; and
   a roller holder that is rotatably mounted on the main shaft, the roller holder having mounted thereon cam followers that engage the cam system, the roller holder being further connectable to an actuator shaft for rotatable control by an actuation device.

9. The pulley as claimed in claim 8 wherein the actuation device is adapted to actuate the cam system with a rotational force, according to an engine speed of the vehicle, a throttle position of the vehicle and an actual position of the mobile sheave.

10. The pulley as claimed in claim 8 wherein the cam system has a cam that is rotatably connected to the mobile sheave and that defines a plurality of inclined peripheral ridges adapted to rotatably and peripherally guide the corresponding cam followers from a lower position to an elevated position, the lower position being in proximity with the mobile sheave and the elevated position being in proximity with the actuation device.

11. The pulley as claimed in claim 10 wherein the cam has a plurality of track rollers that are adapted to engage corresponding stationary fork members each defining a track adapted to axially guide the track rollers from a distal position to a proximal position with respect to the fixed sheave as the cam followers are guided respectively from the lower position to the elevated position.

12. The pulley as claimed in claim 10 wherein the cam is mounted on a drive flange of the mobile sheave and is axially maintained in place with respect to the mobile sheave, by a cam retaining ring.

13. The pulley as claimed in claim 8 wherein the actuation device is an electronic gear motor.

14. The pulley as claimed in claim 8 wherein the roller holder is axially maintained in place on the main shaft between a shoulder of the main shaft and a holder retaining ring.

15. A method of controlling a continuously variable transmission (CVT) having a controllable pulley having a mobile sheave and a fixed sheave, the method comprising:
  measuring an engine revolution speed;
  reading a throttle position;
  sensing an actual position of the mobile sheave of the pulley;
  determining a target position of the mobile sheave, according to the measuring and reading;
  determining a control signal adapted to control an actuation device, according to the sensing and the determined target position;
  providing a rotational movement to a cam system according to the determined control signal; and
  providing an axial movement to the mobile sheave according to the provided rotational movement.

16. The method of controlling a continuously variable transmission (CVT) of claim 15 further comprising detecting a brake activation and wherein the target position is further determined according to the detecting.

17. The method of controlling a continuously variable transmission (CVT) of claim 15 wherein the control signal is a pulse-width modulation signal.

18. The method of controlling a continuously variable transmission (CVT) of claim 17 wherein the actuation device is an electric gear motor.

* * * * *

UNITED STATES PATENT AND TRADEMARK OFFICE
CERTIFICATE OF CORRECTION

PATENT NO. : 10,711,888 B2
APPLICATION NO. : 15/840545
DATED : July 14, 2020
INVENTOR(S) : Raphaël Tardif-Leblanc et al.

It is certified that error appears in the above-identified patent and that said Letters Patent is hereby corrected as shown below:

In the Drawings

Sheet 8, Fig. 7, insert a reference number -- 607 -- between the reference numbers 606 and 604, as shown on the attached page.

Sheet 11, Fig. 10, insert a reference number -- 607 -- between the reference numbers 714 and 1004, as shown on the attached page.

In the Specification

Column 5, Line 1, after 'presents' insert -- a --.

Column 5, Line 11, delete "Isometric" and insert -- isometric --, therefor.

Column 7, Line 44, delete "400" and insert -- 612 --, therefor.

Column 10, Line 39, delete "the" and insert -- to --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*